(12) United States Patent
Truong et al.

(10) Patent No.: US 12,456,207 B2
(45) Date of Patent: Oct. 28, 2025

(54) SYSTEM AND METHOD OF PROCESSING IMAGES ASSOCIATED WITH OBJECTS IN A CAMERA VIEW

(71) Applicant: Palexy Pte. Ltd., Singapore (SG)

(72) Inventors: Minh Truong, Ho Chi Minh (VN); That-Vinh Ton, Ho Chi Minh (VN); Tuan Vu, Ho Chi Minh (VN)

(73) Assignee: PALEXY PTE. LTD., Singapore (SG)

( * ) Notice: Subject to any disclaimer, the term of this patent is extended or adjusted under 35 U.S.C. 154(b) by 306 days.

(21) Appl. No.: 18/094,788

(22) Filed: Jan. 9, 2023

(65) Prior Publication Data

US 2023/0401725 A1 Dec. 14, 2023

Related U.S. Application Data

(60) Provisional application No. 63/327,255, filed on Apr. 4, 2022.

(51) Int. Cl.
*G06T 7/246* (2017.01)
*G06T 7/292* (2017.01)
*G06V 10/32* (2022.01)
*G06V 20/52* (2022.01)

(52) U.S. Cl.
CPC ............ *G06T 7/248* (2017.01); *G06T 7/292* (2017.01); *G06V 10/32* (2022.01); *G06V 20/52* (2022.01); *G06T 2207/10016* (2013.01); *G06T 2207/20081* (2013.01); *G06T 2207/30196* (2013.01); *G06T 2207/30232* (2013.01); *G06V 2201/10* (2022.01)

(58) Field of Classification Search
None
See application file for complete search history.

(56) References Cited

U.S. PATENT DOCUMENTS

| | | | | |
|---|---|---|---|---|
| 2005/0002546 | A1* | 1/2005 | Florent | G06T 5/50 382/128 |
| 2017/0070707 | A1* | 3/2017 | Winter | G06V 20/176 |
| 2018/0046865 | A1* | 2/2018 | Chen | G06T 7/20 |
| 2020/0134339 | A1* | 4/2020 | Zucker | G06F 18/217 |
| 2022/0245792 | A1* | 8/2022 | Gao | G06T 7/0008 |
| 2023/0237801 | A1* | 7/2023 | Fang | G06V 20/42 345/419 |
| 2024/0087365 | A1* | 3/2024 | Pylvaenaeinen | G06V 10/762 |
| 2024/0144485 | A1* | 5/2024 | Saghiri | G06V 10/62 |
| 2024/0161497 | A1* | 5/2024 | Luengo Muntion | G06N 3/08 |
| 2025/0054165 | A1* | 2/2025 | Mims | G06T 7/248 |

* cited by examiner

*Primary Examiner* — Delomia L Gilliard
(74) *Attorney, Agent, or Firm* — Procopio, Cory, Hargreaves & Savitch, LLP

(57) ABSTRACT

Aspects of the example implementations are directed to methods, systems and apparatuses associated with processing of images associated with objects in a view of one or more cameras co-located in a space. The example implementations may be directed to estimating a physical distance between a first person and a second person (e.g., customers) in a camera view; detecting an interest in a section (e.g., shelf) by the first person or second person; estimating relative distances between views of the one or more cameras, to determine which camera views are overlapping and non-overlapping; and detecting static objects (e.g., false positives) that may appear similar to a customer, such as posters of people, mannequins, or the like, and removing the static objects from the processed images.

39 Claims, 10 Drawing Sheets

SYSTEM AND METHOD OF PROCESSING IMAGES ASSOCIATED WITH OBJECTS IN A CAMERA VIEW

TECHNICAL FIELD

The example implementations relate to the field of image processing, and more specifically, using one or more video streams from pre-positioned cameras in a location to estimate a physical distance between a first object and a second object.

RELATED ART

In a related art store, customers may visit and browse to make a decision on a purchase, and complete the purchase and leave the store. Additionally, staff may interact with the customers in the store, and may also perform functions such as payment transaction, security and the like. Related art stores may also have cameras positioned throughout the store to capture video streams, such as for safety, security or to find customers who need assistance.

The video streams from the related art cameras may be provided to a centralized location for viewing. The viewing may manually be performed by security persons or staff. However, the related art approaches do not provide the user with a way of knowing and understanding the traffic patterns and interactions of customers in the store, and specifically with respect to sections of the store. Further, the related art approaches do not provide a way to automatically estimate a distance between two persons on a floor of a store, from the video cameras that are installed at a distance from the persons on the floor, such as in the ceilings or corners near the top of the store.

Further, the journey of a user through a store across multiple cameras in a camera system is not tracked in an accurate manner that provides meaningful analytical information to users, such as store managers or the like, and tracking interactions between customers and staff. For example, because floor distances from pixel to pixel on a camera view are not uniformly distributed between different parts of a camera view and different camera views, accurate notation of a distance between customers and users cannot be obtained in the related art. Further, sometimes there is missing information from a camera, such that the lack of data prevents calculation of such information.

SUMMARY

Aspects of the example implementations are directed to methods, systems and apparatuses associated with processing of images associated with objects in a view of one or more cameras co-located in a space. The example implementations may be directed to estimating a physical distance between a first person and a second person (e.g., customers) in a camera view; detecting an interest in a section (e.g., shelf) by the first person or second person; estimating relative distances between views of the one or more cameras, to determine which camera views are overlapping and non-overlapping; and detecting static objects (e.g., false positives) that may appear similar to a customer, such as posters of people, mannequins, or the like, and removing the static objects from the processed images.

According to an aspect, a computer-implementation method is provided for estimating a distance between a first object and a second object, the computer-implemented method comprising: a preprocessing operation in which video streams from individual cameras as stored in a cloud are retrieved, and frames of the video streams are normalized; a processing operation in which bounding boxes are extracted from the normalized frames to generate feature vectors and detect attributes; a merging operation in which the extracted bounding boxes associated with a person are merged into a group to generate a tracklet; and an aggregating phase in which, the tracklet and metadata associated with user defined sections of an area in the video streams are aggregated to perform operations that generate analytical outputs.

According to another aspect, wherein the merging operation includes the estimating of the distance between the first object and the second object, further comprising: estimation of a total amount of time, such as the total seconds, to move from a first position to a second position; generating a map associated with pixel information of the video streams, wherein for pixels that do not have required information, an estimation is performed from an adjacent point having data, using interpolation, and wherein a floor distance may be estimated from the video streams based on grouping by camera view, and for each camera view:
  extracting frames from videos by fps—frame per second;
  detecting the person in each frame with a corresponding foot position (fx, fy) of the person on the camera view; and
  performing feature extraction for each person in each frame.

According to another aspect the feature of a person is a vector of float value mapping from image space to feature space, in which images of a same person have a small Euclidean distance between corresponding features in feature space, and images of a different person have a large Euclidean distance between corresponding features in feature space.

According to still another aspect, for each pair of adjacent frames, matching visitors from a previous frame to a next frame are determined by the feature distance on the feature space.

According to a further aspect, for each matching pair of visitors, calculation of a maximum displacement in an up direction, down direction and left/right direction is performed and logged as statistics of each pixel in the camera view.

According to a still further aspect, distance may be calculated between two positions on the camera view, and a maximum displacement in the up, down, left/right directions is used to estimate distance from one point to another.

BRIEF DESCRIPTION OF THE FIGURES

The example implementations and the following detailed description of certain example implementations thereof may be understood by reference to the following figures.

DETAILED DESCRIPTION

Figure 1:
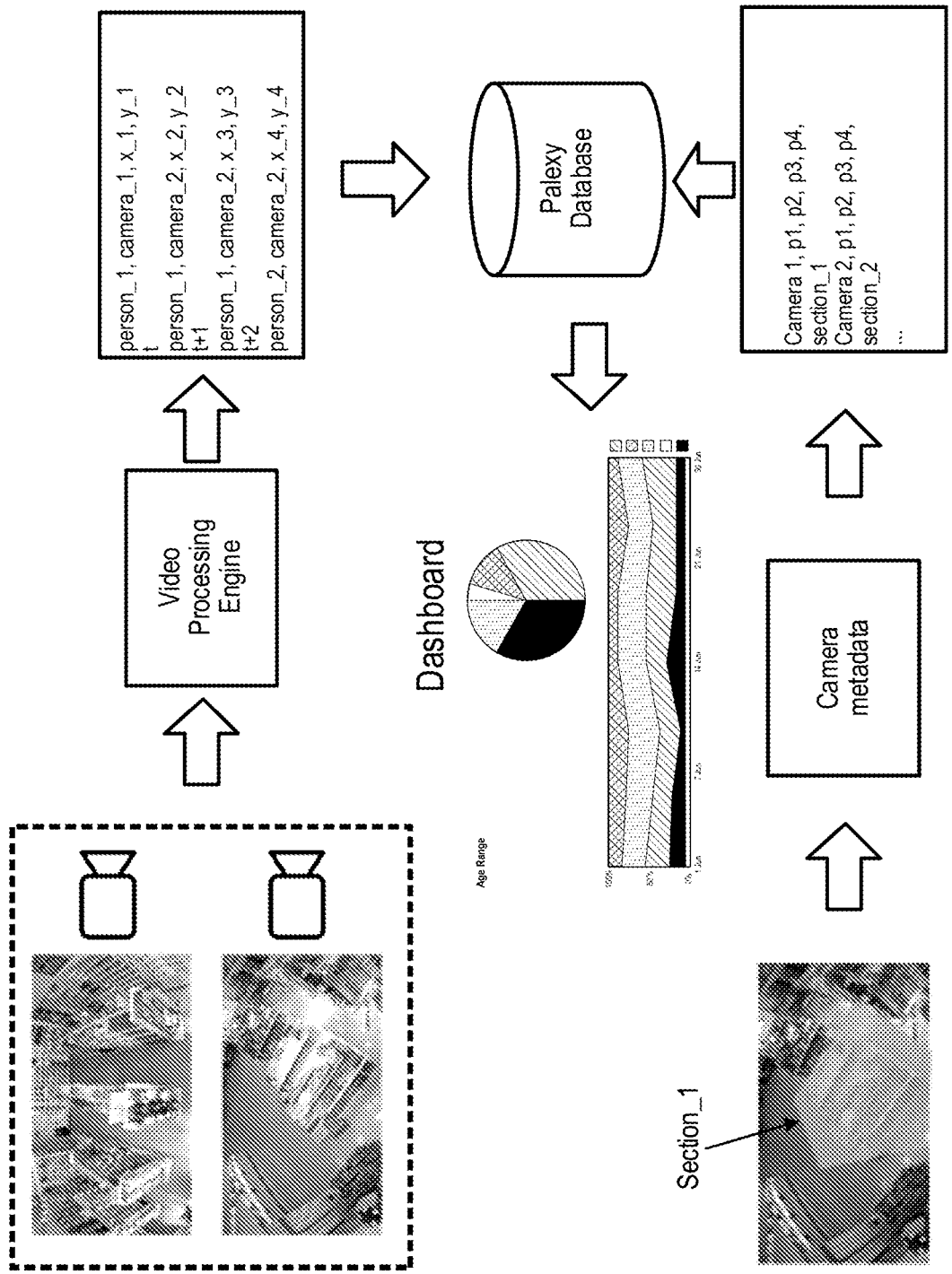
FIG. 1 is a schematic view of the system according to the example implementation.

The following detailed description provides further details of the figures and example implementations of the present application. Reference numerals and descriptions of redundant elements between figures are omitted for clarity. Terms used throughout the description are provided as examples and are not intended to be limiting. Example implementations as described herein can be utilized either singularly or in combination and the functionality of the example implementations can be implemented through any means according to the desired implementations.

The example implementations are directed to a platform that receives information from a plurality of inputs, performs a series of processes, and generates outputs, such as information or recommendations associated with the processing. The information may be provided to users as actionable information. FIG. 1 illustrates an overview of the system.

More specifically, a plurality of sensing devices may be provided at a location, such as a retail venue. The retail venue may include, but is not limited to, a grocery store, a warehouse, or other location where a user must navigate through a premise to view goods, make a decision or selection, and proceed to make one or more additional decisions or selections. In this implementation, the sensing devices include video cameras that are positioned in a stationary manner, such as on the ceiling or in a corner at a upper level of the premise. The video cameras may be independent of or integrated with a video security system. In the former approach, the camera system may be independently installed, whereas in the latter approach, existing infrastructure may be used in its existing state or retrofitted.

An output of the video stream from the video cameras located within the stores is provided to a processing system. The processing system may be located remotely from the store, such as in a cloud server or a distributed remote storage and processing system. The video stream is processed by a processor that performs a set of operations based on instructions from an executable program stored in a computer readable medium. The computer readable medium may be non-transitory. By performing the operations in the processor, individuals are extracted from the video in each frame of each video in the video stream.

The individuals extracted from each frame of each video stream are then merged together, across the multiple cameras. As a result of the merging, full journey data associated with the activity of the individuals in the store may be generated. Further, the journey data associated with the location of each individual in each camera at each point in time is stored in a database.

In addition to the foregoing aspects, the example implementation also includes an augmentation. More specifically, the journey data may be overlaid or merged with additional information by the use of polygons within one or more zone of the store. As shown in the drawing, a user of the system, such as a store owner, may define a section within the store, such as a display associated with a promotion or a certain type of product, such that an indication is provided when one or more of the individuals are positioned within the polygon in that camera. That information is merged with the locational information of the individual users and stored in the database.

Once the information has been stored in the database, further analysis and visualization may be provided for the user, such as in the form of a dashboard. The information may be provided to the user, or analytical or decision-making purposes as an example. Information that may be provided at from the database may include, but is not limited to, total visitors, dwell time in stores, demographic information associated with visitors, dwell time in each user-defined zone in one or more stores, staffed with customers. The foregoing list is exemplary only, and further information may be provided as would be understood by those skilled in the art.

Figure 2:
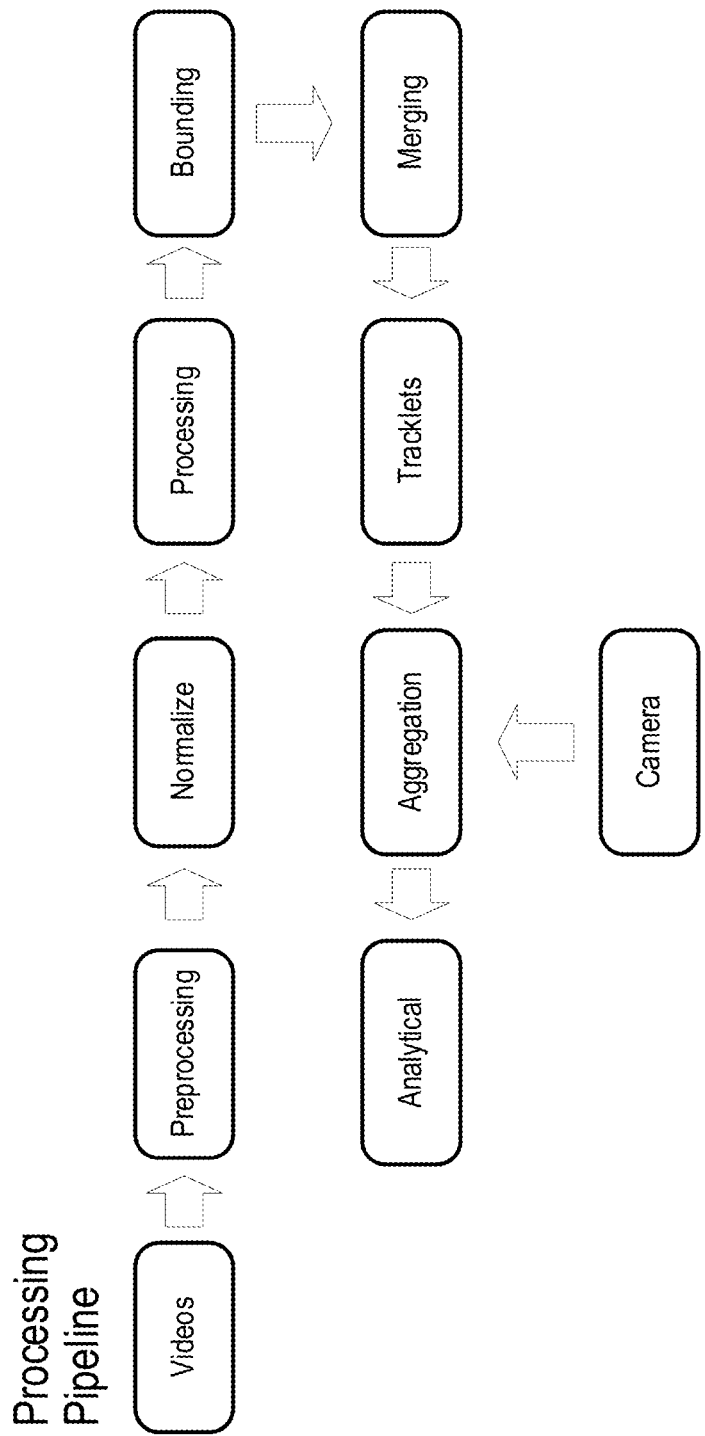
FIG. 2 illustrates the processing pipeline according to the example.

To execute the processing of the foregoing example implementations, a processing pipeline may be provided. In accordance with the foregoing disclosure, the input to the pipelines includes video streams from the one or more video cameras located in the store. The output of the pipeline is the analytical information that is provided to one or more other applications. As shown in FIG. 2, the pipeline comprises four main phases, including preprocessing, processing, merging and aggregation. In the preprocessing phase, the video streams from the individual cameras as stored in the cloud are retrieved, or fetched, and an operation is performed to produce frames that are normalized. Thereafter, in a processing operation, the frames that were normalized in the preprocessing operation are provided for processing, to extract bounding boxes, generate feature vectors, and detect attributes, such as gender, age or the like.

In a merging phase, the extracted bounding boxes that were generated during the processing phase and the associated detailed information is merged, so that the bounding boxes of a person are merged together. A group of the bounding boxes associated with that person, or object, is called a tracklet.

In the aggregating phase, the tracklets and metadata associated with the user defined sections are aggregated to perform operations that generate analytical outputs, such as insights, that are stored in a database or use by other applications. For example but not by way of limitation, the database may be a relational database. Additional details of each of the phases are disclosed in greater detail below.

Figure 3:
FIG. 3 illustrates example frames after extraction in the pre-processing phase according to the example implementation.

In the pre-processing phase, as explained above, the inputs are the video streams from the cameras located in the one or more stores. More specifically, the pre-processing phase performs a normalization operation to receive camera input in the form of video streams, and normalize the extracted frames to fit. More specifically, the normalization process may include operations such as rescaling of the video resolution, performing operations to address a broken frame or a broken timestamp or other normalization operations, as would be understood by those skilled in the art. FIG. 3 illustrates example frames that have been extracted from videos in the pre-processing phase.

Once the pre-processing phase has been completed for the input video streams, the preprocessed, normalized frames are further processed. More specifically, for each frame of each video stream, bounding boxes and the foot located in of all persons within the frame are extracted. The bounding box includes a rectangular box that forms a boundary to cover a substantial portion of the person's body in the frame.

Figure 4:
FIG. 4 illustrates example bounding boxes according to the example implementation.

The foot location includes the coordinates associated with a position of the feet of the person identified in the frame in camera coordination. FIG. 4 illustrates examples of bounding boxes. As can be seen, the bounding box covers most of the person's body.

Once the bounding box has been defined an extracted by the processor, further information is determined with respect to the individual or person in the bounding box or the frame. For each of the bounding boxes, information may include age group, gender and bidirectional. For example, the body direction may be generated by a vector that represents a direction of the body in a two dimensional plane. This vector may be used to calculate and determine whether the person in the bounding box is facing toward an object, such as a shelf or a section within the store, as explained further below.

Further, the feature vector may be multidimensional, such as in 1024 dimensions, representing the bounding box. More specifically, this feature vector may be generated by an artificial intelligence model, which is trained to minimize a distance between vectors of the same persons. The distance between this vector may be used to connect the journey of a visitor on the same camera, as well as across multiple, disconnected cameras.

For example, but not by way of limitation, plural machine learning models, such as for separate machine learning models, may be used for bounding box extraction, demographic estimation, body direction, and feature vector extraction. According to one example implementation, the feature vector extraction model may include a deep learning model that is train by using a very large amount of images, such as 30 million images, as the training data. The 30 million images may be captured, in the real world, for performance optimization. According to the example implementation, there may be an advantage or benefit of improving upon related art training approaches associated with re-identification of a person.

As an output of the processing base, a set of bounding boxes is provided, along with the above disclosed extracted information. The output is used in the merging phase, as explained below.

At the merging phase, the data associated with individual bounding boxes that was generated in the processing phase is merged together, or connected, to create tracklets. This operation includes processing each of the data points from each of the frames in each of the video streams from each of the cameras, and connecting those data points together.

Figure 5:
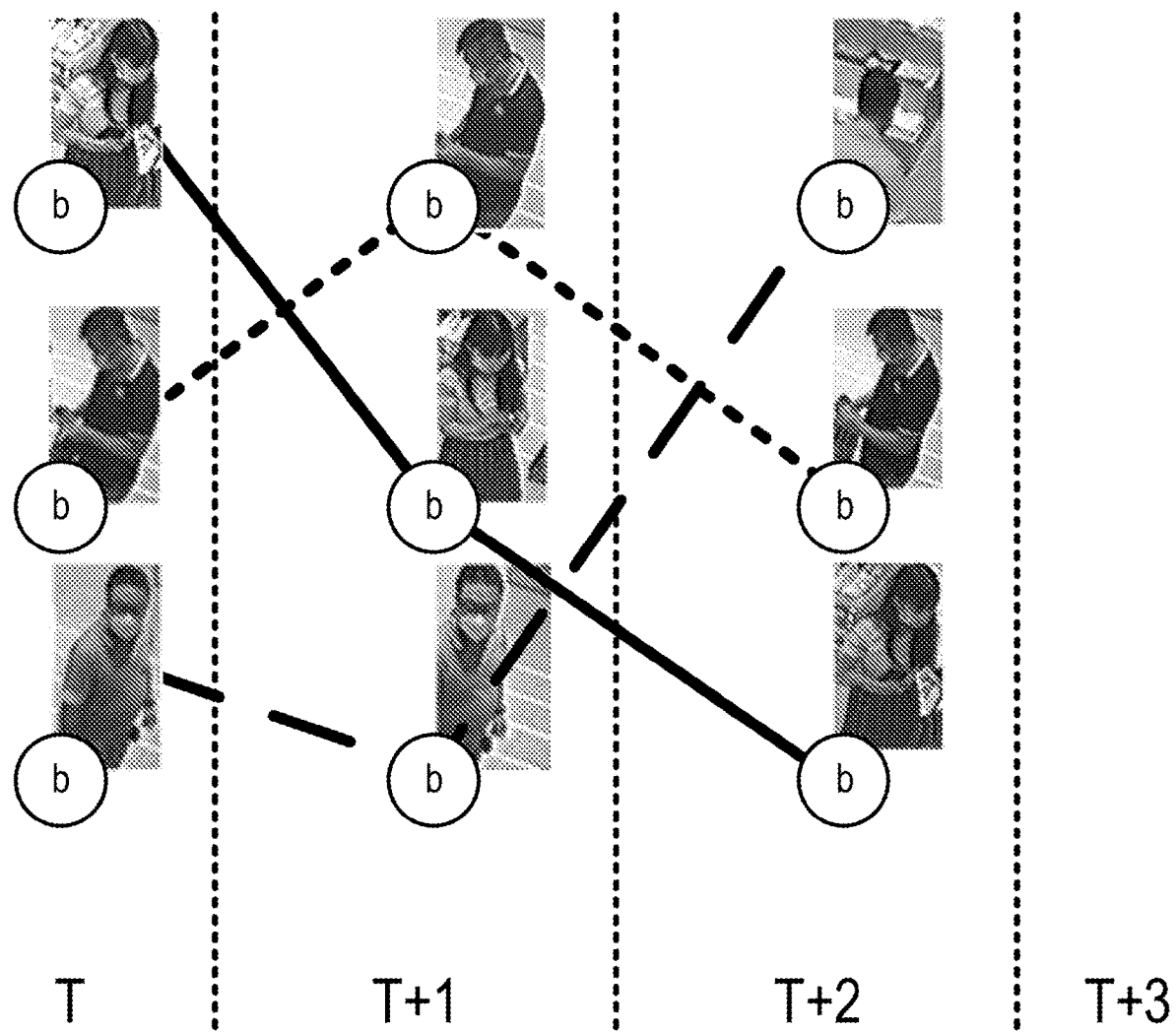
FIG. 5 shows an example of merging of bounding boxes according to the example implementation.

According to one example implementation, a store may have 1000 visitors per day, and average time that each of the visitors spends in the store is 20 minutes. The movement of each of the visitors is captured by at least one camera each second. Thus, for this store, there are 1000 visitors per day, multiplied by 20 minutes per visitor, multi-60 seconds permitted, multiplied by one captured image per second, resulting in 1.2 million data points to connect in the merging operation per store per day. This process amounts to roughly connecting the correct notes in a graph with 1.2 million notes. FIG. 5 and strict a process of connecting notes in a bounding box in the right order. From left to right, the time sequence is provided on a second by second basis. The bounding boxes generated at each frame of the video stream is shown vertically. The different lines connecting the bounding boxes are the result of the merging operation.

The merging operation includes multiple components. Generally speaking, the components of the merging operation include, but are not limited to, connecting journeys within a single camera, connecting journeys between multiple cameras, removing outliers, detecting persons who are staff, as opposed to visitors, computing interaction between staff and visitors or customers, and computing a group visit. According to one example implementation, information is created with staff, such as customer service representatives or employees working in the store, may be seeded prior to the merging. Thus, staff may be detected, excluded and grouped into the staff detection phase. However, the stack detection phase is just an example, and the merging operation can also be performed without separately processing and detecting the staff.

As explained above, the merging operation includes a phase of connecting journeys within a single camera. In this phase, the bounding boxes that belong to the same camera are connected to form the tracklets. Because the bounding boxes are associated with the same camera, there is consistency in terms of image quality, camera angles, and continuity in space and time as visitors move with a that camera view. Accordingly, connecting journeys within the same camera may reduce the complexity of the data processing, by grouping bounding boxes into tracklets, without reducing the accuracy of the process.

The connecting of the journeys in the single camera may be performed as follows. The bounding boxes from the same camera are grouped together on a time basis. Thus, all of the bounding boxes that appear at the same time are assigned to the same group. The resulting groups are then sorted by timestamp, in increasing order. For each subsequent group, that new group is looped through each bounding box, and the best bounding box of the previous group is selected as the one that is most similar. For this selection process, there are constraints. For example, each bounding box within a group can connect to only one bounding box of the previous group.

Additionally, a bounding box in the same group cannot be connected to another bounding box in that group. In other words, the same person cannot appear twice from the same camera at the same assign. Further, the vector distance between two bounding boxes is defined to be smaller than a threshold to be connected. The bounding box may also have no connection the previous bounding box, and thus be assigned as a starting point of a new tracklet (e.g., a person appears in a frame for the first time).

The processing of information may be defined as an optimal assignment problem, and solve using the Hungarian matching algorithm to find an optimal match between bounding boxes. The Hungarian matching algorithm is applied in the present example implementation to use three factors to generate the cost function. One factor is the eclipse distance between feature vectors of bounding boxes, which can be roughly understood as a similarity between clothes of two bounding boxes. Another factor is the intersection over union, which may be referred to as the Jaccard Index, calming boxes. This factor may measure a degree of overlap between the bounding box in the camera space. A third factor is time distances between the bounding boxes. The further the bounding boxes are from each other in time, the less likely it is that two bounding boxes can belong to the same person.

After the foregoing operations are performed to loop through all of the groups, all of the bounding boxes that connect together form a tracklet. All of the tracklets associated with the single camera are stored and provided for further processing.

Once the journeys within a single camera have been connected to generate all of the tracklets, for each of the cameras, the tracklets are connected between multiple cameras as explained below. This connection between multiple cameras is performed as an operation associated with a graph problem, in which each node is representing a tracklet having multiple attributes or properties, including a camera identifier, a start time, an end time, and bounding boxes within each of the tracklets, and the associated properties.

Related art approaches may encounter problems or difficulties when connecting tracklets, including but not limited to the following situations. In one circumstance, where the store does not have cameras that fully overlap, customers may disappear from all of the camera views, and then appear again, with a gap between camera views. Additionally, different cameras may have different angles and lighting, as well as intrinsic color setting. Further, there are situations in which a customer may not appear the same in different cameras, such as when a customer steps into or out of a fitting room for changing clothes. Further, different customers may appear similar, such as customers wearing similar clothes.

To address the foregoing closer difficulties in the related art, the present example implementation includes various operations. For example, additional constraints may be generated for the operations.

One such constraint may be that two tracklets associated with a single person cannot overlap in time, unless it is determined that they belong to cameras that have overlapping views. Another example of a constraint into the example implementation is that two tracklets of the same person can only move between a predefined set of cameras within a predefined threshold in time.

To implement the foregoing aspects, the following example approaches may be employed. More specifically, these example approaches are directed to regenerating the relative position map between cameras, and supporting the tracking of visitors across views associated with different cameras. According to the related art, there are problems and challenges associated with the cost of arranging and maintaining camera relationships, especially in venues having many cameras. For example but not by way of implementation, for a store having 50 cameras, it is necessary to maintain 1200 relationships in order to track visitors across views associated with cameras. Thus, the example implementations are directed to the automatic generation of relationships between cameras. More specifically, one camera may be determined to have a spatial relationship with other cameras, such as nearby, overlapping, far, or the like.

As applied to the present implementations, an "overlapping camera pair" is defined to exist when an object, such as a visitor in the store, appears simultaneously, or substantially simultaneously, on the views of both cameras in the pair. A "nearby camera pair" is defined to exist when a visitor appears simultaneously or substantially simultaneously on the views of both cameras in the pair, or a prescribed time period. For example but not by way of limitation, for example but not by way of limitation, the time window may be five seconds, 10 seconds, 30 seconds, or any window of time that is indicative of a camera they are being nearby to one another. Additionally, a "long distance camera pair" exists when the conditions for "overlapping camera pair" and "nearby camera pair" are not met. Further, it is understood, that the time between cameras in the pair has been fully synchronized and calibrated, and that the amount of traffic that each of the cameras in the camera pair is exposed to is of a sufficient volume to build the relationship graph.

Accordingly, the following processes employed in the example implementation to build a camera relationship graph. A grouping operation is performed, such that videos are grouped by camera view. To perform this grouping operation, for each camera view, frames are extracted from the videos. Further, in each frame, a person is detected, and the corresponding foot position (fx, fy) on a camera view is derived. Feature extraction is performed for each person in each of the frames, for each camera view.

To perform the feature extraction, the feature of a person is defined as a vector of float value mapping from an image space to a feature space. More specifically, Images of the same person will have a small Euclidean distance (~0.0) between corresponding features in feature space, and images of the different person will have a large Euclidean distance (~2.0) between corresponding features in feature space.

For each pair of camera views, and operation is then performed to check overlapping conditions. The check for overlapping conditions is performed by matching bounding boxes at the same time, or the substantially same time, on both camera views. If a visitor is confirmed to exist on both of the camera views at the same time, the camera pairs are characterized as overlapping pairs.

Additionally, the same visitor as checked in the foregoing operation is checked, by comparing feature distance on the feature space. Nearby conditions are checked by matching bounding boxes at a prescribed timeframe on both camera views. For example the time frame may be five, 10, 15, 30 seconds or another amount of time, as explained above. If a visitor is determined to exist on both camera views at the same timeframe, and operation is performed to define as t-<timeframe> nearby pairs (e.g., t-5 nearby pairs, which can reach from 1 camera to others within 5 seconds). All other repairs are defined as "long distance", if they are not defined as overlapping or nearby.

Yet another example of a constraint is that two tracklets of the same person cannot exceed a prescribed distance in time, unless the feature distance therebetween is smaller than a prescribed threshold. Still another example of a constraint according to the example implementations is that two tracklets of the same person must have a picture distance that is smaller than a prescribed threshold. The foregoing examples of constraints are exemplary only, and other constraints may be implemented as would be understood by those skilled in the art.

Incorporating the foregoing constraints, the foregoing operations associated with connecting journeys within the same camera are implemented, wherein the tracklet groups are formed by adjacent tracklets in time that meet the defined criteria and conditions. At each operation, a best match is determined between members of a current group as compared with members of the previous group, using the above disclose Hungarian algorithm. In this example implementation, the cost function between tracklets is based on the eclipse distance between a median of feature vectors of bounding boxes that belong to that tracklet. Further, the tracklets that are connected together must meet the defined constraints, such as those explained above.

After looping through all of the groups for the multiple video cameras, all of the tracklets that are connected together form a new tracklet that represents the entire journey of the visitor through all of the cameras in the store.

While the foregoing example implementation discloses the generation of the tracklet associated with the entire journey of the visitor through all of the cameras in the store, additional variations may be provided. For example, aspects of the example implementations may include a process that identifies a situation where a visitor leaves the field of view of the multiple cameras, such as to leave the store to get a grocery bag from their car, to go to the bank to get money, or to use a restroom within a portion of the store that does not include a camera, and then returns to the field of view.

Further, aspects of the example implementation may include a process to remove outliers, such as images in posters or promotional materials, mannequins in the store, or other information that is a false positive of a visitor to the store. This operation may be performed before, during or after the generation of the tracklet.

According to the example implementations, to perform the detection and determination of the false positives as explained above, such as posters of people, manikins or the like, so that they are not characterized as actual visitors, operations are performed according to the following example implementations.

It is understood that the example implementations are performed in order to exclude false positive person bounding boxes from the final results, and avoid skewing or misclassification of data, and to produce more accurate results. In two-dimensional images, it is possible that an image that appears to resemble a person, such as a two dimensional poster of a person, or a three-dimensional mannequin, may be classified as a person. However the classification of such images or objects as persons are considered to be false positives. The false positives may affect the final traffic results for the store. For example but not by way of limitation, such false positives may cause the number of people in the store to be over counted, or misrepresented as being in certain areas containing the false positives, thus skewing the traffic results as well.

Accordingly, the following example implementations are provided to reduce or minimize the impact of such false positives. According to the example implementations, the false positives may be determined to stay at a stationary sample location in a camera view throughout the day, and that they are not being moved. On the other hand, the normal traffic of visitors moves through the camera view and around the store, rather than staying at the same place for a long period of time. Although "long period of time" is not defined as a specific period, one skilled in the art would understand that it would represent a time that is longer than a visitor would stay in a single place in a store. In some examples, this time would be longer than one hour, although not limited thereto.

To implement the process, false positives are excluded from the traffic by performing the following operations. First, videos are extracted two frames. Then, a person is detected in each frame of the videos, with the corresponding foot position (fx, fy) that is in the camera view.

Then, a feature extraction is performed for each person in each frame of each of the videos. More specifically, the feature of the person is a vector of a float value mapping from the image space to the feature space, in which images of the same person will have a small Euclidean distance (~0.0) between corresponding features in feature space, and images of the different person will have a large Euclidean distance (~2.0) between corresponding features in feature space.

For each camera view, and operation is performed to aggregate, on each pixel, the number of bounding boxes that contain that pixel. Because false positives are static, the bounding boxes with the false positives will contain the top the highest pixels. Further, the top highest pixels are gradually picked, while having most bounding boxes containing the top highest pixels. The top highest pixels are removed, along with their neighbors. By using this integrative approach, the search space is reduced, and the next highest pixels are considered. A prescribed number of pixels is selected. According to the present example implementation that number of pixels may be 15, however the number may be modified as would be understood by those skilled in the art.

For each of the selected pixels, a list of bounding boxes containing the pixels is generated. Then, a graph is generated. In the graph, a node is defined as each of the bounding boxes. An edge is defined as the edge between two bounding boxes, if the Euclidean distance on the feature space between the two bounding boxes is less than a prescribed threshold. For example, but not by way of limitation, one possible threshold may be 0.2. Subsequently, a connected component is detected in the generated graph. For each of the connected components, a determination is made as to whether that component is a false positive component. Such a determination may be made if a prescribed condition is met. For example, the prescribed condition may be (total bounding box>threshold, the max timestamp−the min timestamp>1 hour). For each such false positive component, the bounding boxes are removed in those false positive components.

Additionally, as explained above, staff may be detected, as distinguishable from customers or visitors. One or more signals may be associated with an identification of staff, including but not limited to staff uniforms, staff behavior, such as being located behind a cashier, performing stocking, visiting non-customer areas or the like, and duration within a store, such as for the duration of a work shift. According to one example implementation, when using staff uniforms, a feature vector generated in the processing phase associated with the staff uniform may be stored, along with captured images of the bounding box. The bounding box may be provided for manual categorization. Further, as staff are added were removed, the database of staffing vector to be updated. In the detecting phase, a distance between the staffing vectors previously stored and the vector of the bounding boxes is calculated, to recognize whether the person is wearing a staff uniform.

According to this example implementation, there may be various benefits or advantages over the related art. For example, but not by way of limitation, when uniforms are finished or there are different uniforms, it is not necessary to update the entire system. Further, the existing data may be easily updated in situations where updates are provided outside of the sequence of standard system updates.

Additionally, staff customer interactions are detected. According to one example implementation, and interaction between a staff and a customer occurs when a staff is within a prescribed distance of a customer, such as to meters, and for a prescribed amount of uninterrupted time, such as 15 seconds. As explained in greater detail below, the physical distance between two persons may be estimated, given their locations on camera pixels.

Further, a group may be identified and detected. More specifically, the graph of the journeys of each person is used to estimate which persons are traveling together within the store as a group.

Once the merging has been performed as explained above, the final tracklets are provided for aggregation. More specifically, the aggregation may involve joining of the above explained metadata associated with the user defined section, to augment the journey, for additional user information. For example but not by way of limitation, a person who is interested in a particular section may be detected. Performed this detection, it is necessary to not only have information associated with a foot location of a person, but also the direction of the body of the person, to determine a level of interest in a particular user-defined section.

As noted above, interaction between staff and customer may be estimated. The estimation of a distance between multiple objects, objects being people, in a camera view may be used for various purposes. For example, by being able to estimate a physical distance between the people in a camera view interaction between staff and visitors may be estimated. Further, tracking of the visitors in the store may be supported, by using the displacement between visitors in a given timeframe.

However, related art approaches may have a difficulty in performing this estimation due to the configurations of cameras. For example, floor distances from pixel to pixel on a camera view are not uniformly distributed between different parts of a camera view, as well as different camera views. Thus, the related art does not provide a standard for comparison within a camera view or across camera views.

Accordingly, the example implementations are directed to a method of using provided coordinates on a pixel to estimate a real-life distance on the floor between users. The example implementations may automatically provide the estimation when just provided with a camera view and data associated with a given time period, such as a day. Further, no manual calibration is required.

More specifically, the example implementations use a formula to perform the estimation. Using d=v*t (d: distance, v: velocity, t: time), the average velocity of a person walking avg_v is about 1.4 m/s (meters per second). Based on this determination, the time distance from one point to another may be estimated, and avg_v may be used to map to the estimated distance d. The example implementations operate based on the floor distance of the upper region of the camera view being defined as always being smaller than the distance of the lower region, and further the camera view is held constant as not changing during the day.

Figure 6:
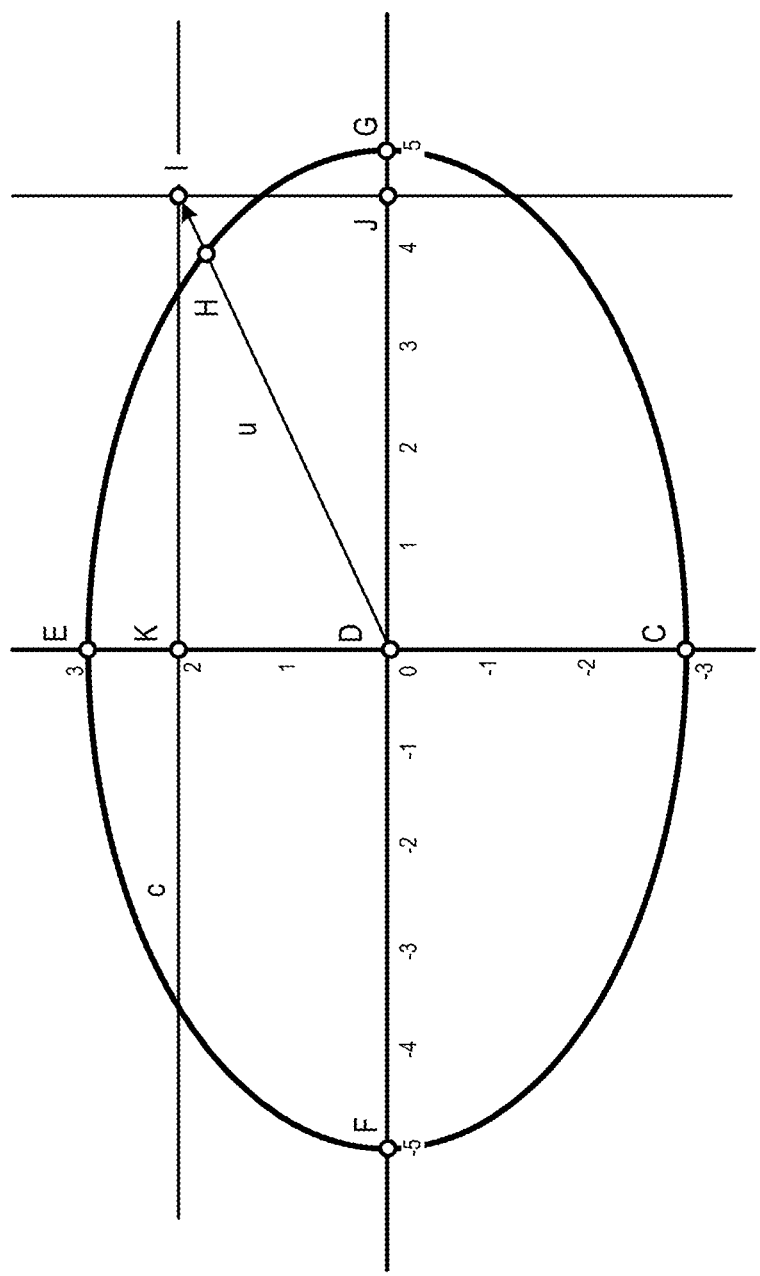
FIG. 6 shows an example coordinate view associated with physical displacement estimation between two persons according to the example implementation.

As shown in FIG. 6, the example implementations perform calculation of the displacement coordinate as follows. For each pixel D in the camera view, in a given timeframe (1/fps=spf~second per frames) there is a maximum displacement in the up vertical direction (DE), the down vertical direction (DC) and the horizontal direction (DG). For example:

Moving from D to the up direction in spf seconds, may result in a jump of DE pixels.

Moving from D to the down direction in spf seconds, may result in a jump of DC pixels.

Moving from D to the left/right direction in spf seconds, may result in a jump of DG pixels.

Estimation of a total amount of time, such as the total seconds, to move from D to I may be performed as follows.

Estimate Euclidean distance on camera view (pixel) to jump from D to I, call this as d_DI.

Estimate unit distance to jump from D to H, number of pixels that can jump from D to H in spf seconds, call this as d_DH.

delta=d_DJ/d_DI d_DH=d_DG*delta+d_DE*(1−delta)

The time to jump from D to I equal: t_DI=d_DI/d_DH*spf

Having t_DI, the floor distance is calculated by t_DI*1.4

With respect to the foregoing example implementations, the map must be generated such that each pixel includes the necessary information. However, there may be instances or days in which one or more pixels does not include the necessary data. However, because the example implementations are based on the floor distance of the upper region of the camera always being smaller than the distance of the lower region, for the points having data, such as visitors standing at a given pixel, the map may be generated. For pixels that do not have the required information, an estimation may be performed from an adjacent point having data, using interpolation.

According to one example of the foregoing process, the floor distance may be estimated from one or more given videos. The videos may be grouped by camera view, and a series of operations may be performed for each camera view. More specifically, the following operations may be performed for each camera view:

Extract frames from videos by fps—frame per second.

Detect the person in each frame with the person's corresponding foot position (fx, fy) on the camera view.

Perform feature extraction for each person in each frame.

The feature of a person is a vector of float value mapping from image space to feature space, in which images of the same person will have a small Euclidean distance (~0.0) between corresponding features in feature space, and images of the different person will have a large Euclidean distance (~2.0) between corresponding features in feature space.

For each pair of adjacent frames, matching visitors from the previous frame to the next frame may be determined by the feature distance on the feature space.

For each matching pair of visitors, calculation of the maximum displacement in the up direction, down direction and left/right direction is performed and logged as statistics of each pixel in the camera view.

Use a percentile (e.g., 99), which may be configured or adjusted, estimate the maximum displacement in the up, down, left/right directions.

Perform interpolation for missing pixels.

Additionally, distance may then be calculated between two positions on the camera view. More specifically, the maximum displacement in the up, down, left/right directions may be used to estimate distance from one point to another. The same operation may be performed, reversing the first and second positions, and an average may be taken between the results.

The foregoing example implementations may have various benefits and advantages. For example, but not by way of limitation, the example implementations may permit for the accurate estimation of a distance between a customer and a staff over time. Thus, it is possible to identify interactions between staff and customers.

According to some aspects of the example implementations, a commercial business such as a store having inventory may desire to track the inventory at a very granular level. Accordingly, the example implementations may incorporate the information generated by the foregoing operations and to provide a tracking system that generates analytical information associated with displays, shelves, aisles or the like. The information may be used to obtain an estimate associated with the interest of a customer in a particular portion of the store, such as a shelf section. However, because the spaces are relatively small, and the shelves are very closely positioned with respect to one another, it is harder to distinguish whether user has interest in one display or another, or between two nearby shelves, for example.

Aspects of the example implementation are directed to approaches to calculate a number of visitors having an interest in each shelf of the store. More specifically, for a store in which multiple cameras are provided in an overnight configuration as explained above, with each of the camera views not being modified during the day, one example process to detect or determine customer interest in a particular shelf or section may be provided as follows.

According to one operation, the initial views associated with the cameras are set up, and regions of interest are indicated on those views. For example, a user may draw a polygon or circle to indicate a specific section or shelf of interest. Based on the indicated region of interest, the tracking system according to the example implementations track the visitors throughout their journey as explained above. Additionally, for the visitors that have a journeying which passes through the indicated region of interest, a body direction is determined, to identify the shelves or sections in which the visitors have an interest.

Figure 7A:
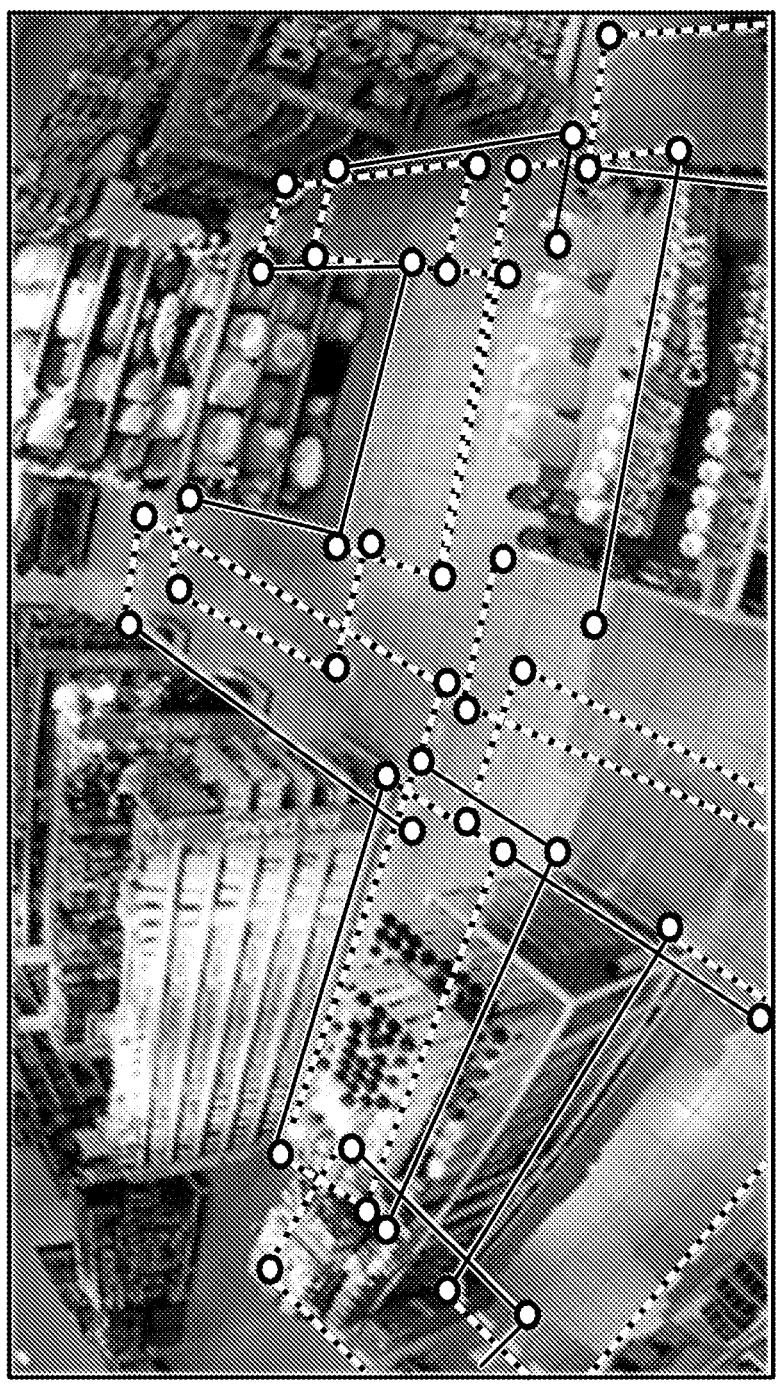
FIGS. 7A and 7B show example illustrations associated with a method of detecting customers interested in a shelf or section of a store.

FIG. 7A illustrates an example setup associated with the example implementations. Different identifiers, such as color or line thickness, may be used to indicate different groupings of shelves or sections. In the example, solid lines are used to indicate shelves that a visitor may interact with, and broken lines are used to combined with the solid lines to indicate the regions of interest, which are the regions that the user must be positioned in, in order to have been considered as having visited that section of interest.

The video streams are extracted as explained above, and the frames are processed. Further, person detection, feature extraction and body direction estimation are used to extract bounding boxes of visitors, similar to the process explained above, as well as corresponding features. The corresponding features may include, but are not limited to, but position, feature representation and body direction. As noted above, the founding boxes are connected to groups, to generate the journey associated with a customer or visitor.

To determine Belfour section of interest, the process is performed according to the example implementation include first detecting a direction of the body of the visitor, and then detecting a shelf or section of interest. A process for each of these operations is disclosed below.

Figure 7B:
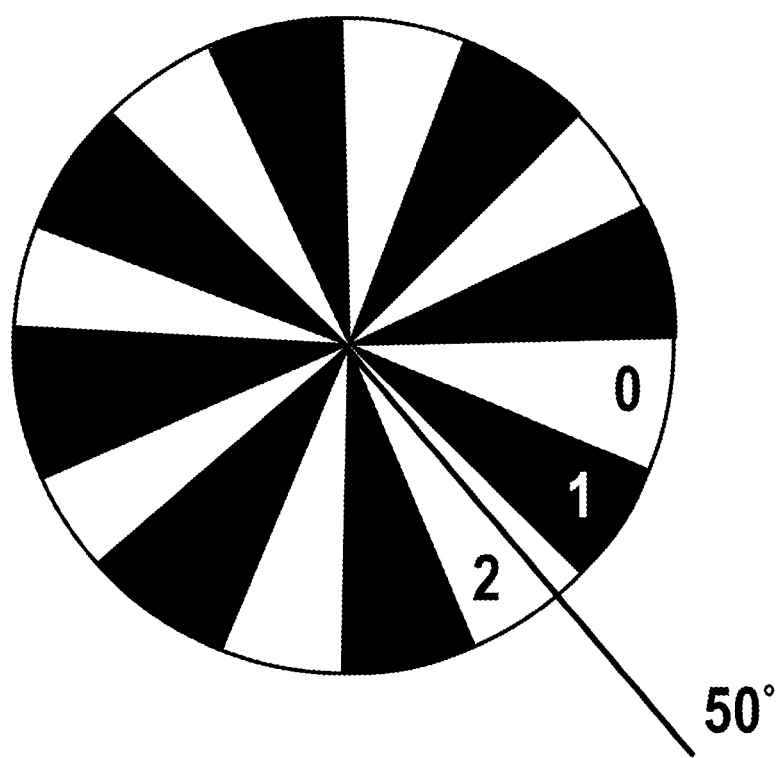

An operation of detecting a body direction may include prediction of the direction of the visitor. FIG. 7B illustrates a graphical analysis to detect the body direction. More specifically to predict the visitor direction, the circle is split into a plurality of sections, in this case 16 parts. However, the circle may be split into more or less parts, as would be understood by those skilled in the art. Further, a prediction operation is performed, to determine a predicted portion that the vector associated with the user at the center of the circle belongs to. Each of the parts of the circle is assigned a numerical value or an index. According to one example, the angle of the vector starts from a rightmost or easterly direction, having an index of idx=0. Moving clockwise, the index is incremented, one integer per part, from 0 to 15. In order to convert each index into a gradient, a formula is applied, more specifically, $((idx+0.5)*2/16-1)*pi$. As a result, a visitor direction and can be estimated.

Further, operation may be performed to detect a shelf or section of interest. More specifically, for each point in the journey of the user, with the point being determined as a particular timestamp, for a particular camera and the particular foot position of the user, the foot position (fx, fy) is checked to determine if it is in a region of interest. If it is determined that the set of regions contain (fx, fy), the regions that have an intersection between the solid line and direction of the body are identified.

If the number of continuous points of the journey that intersect the solid line exceed a prescribed threshold, the journey is identified as being associated with a visitor having an interest in the corresponding shelf or section of the store at that given time stamp. This information may be used to determine traffic or interest in a particular product, shelf, type of display, region of a store or the like, which may assist the user, who may be a manager or store, in arranging displays, ordering inventory, managing or traffic, or the like.

One example implementation of the foregoing aspects is described as follows. More specifically, the inputs may include the following:

Journey of people through time is represented as a list of records representing the data associated with:
Camera id: the current camera id.
Recording time: the current timestamp.
Body direction: the direction of the body at the current time.
Foot position: the (x, y) which are the current coordinates of foot in the camera view.
Camera metadata includes the following:
Camera views: the images represent the view of the current cameras.
Section data: a list of polygons (list of point (x, y) represent the vertex of the polygon on the corresponding camera view) with the corresponding label representing the section names.

The outputs are represented for each individual visitor, as the list of records representing the visit section action. The information of record includes:
Camera id: the current camera id.
Recording time: the current timestamp starting the action.
Duration: the duration visitor spends on this action, starting from the recording time.
Section name: the current section the action happened.

According to the example implementations, a process is provided that may perform operations as discussed herein. The processor may include a processing unit such as a CPU and/or GPU. Further, the processing unit may be positioned remotely from the Rest, wirelessly or wireline connected to the cameras, in a distributed manner, in a single server or multiple servers, or in one or more clients. The process may include the following operations:

1. For each visitor, take the corresponding journey as a list of records.
2. Sort the records by increasing the recording time.
3. For each record, enriching the record with information:
   A. The current sections the foot position belongs to.
      The foot has to be in the polygon of the section.
      The angle between the body direction creates and the perpendicular line of the shelf (e.g., shelf represented as the solid line) is less than the threshold (which may be changed and/or finetuned).
   B. After this step, each record will have related section names corresponding to the current foot position
4. For each section name:
   A. Filter the records having the related section name, which was enriched by the foregoing operation.
   B. Connect adjacent records to groups using recording time. If two records have a time distance smaller than a threshold (e.g., 5 seconds), group them into a single group.
   C The threshold is used in the case excluded by other visitors, who just pass by the section, and exclude the interested visitor, so interested records are still connected by the algorithm.
5. For the groups:
   A. Calculate the duration.
   B. If the duration is less than a threshold (e.g., 30 seconds), remove this group from the final results.

C. This threshold is to support to filter of some false-positive results such as visitors pass by the section, as explained above.

D. The remaining groups are the final results. Obtain the start time of the group and create related records to create the final result to store in the database.

Threshold tuning may be performed as explained below, according to the example implementations To create the ground truth, quality checkers, or QCers, such as store staff, will count the number of visitors who are actually interested in the section. This creates the report by hours as the example in the table below.

| Store Name | Date | Hour | QC min | QC max | System | Accuracy |
|---|---|---|---|---|---|---|
| A | 2021 Jan. 1 | 10 | 1 | 3 | 2 | 100% |
| A | 2021 Jan. 1 | 11 | 3 | 4 | 5 | 75% |
| B | 2021 Jan. 2 | 10 | 2 | 3 | 1 | 50% |
| ... | ... | ... | ... | ... | ... | ... |

The accuracy formula is as follows:

100% if QC_min<=System<=QC_max max(0%, 100%−abs(System−QC_min)/QC_min) if System<QC_min max(0%, 100%−abs(System−QC_max)/QC_max) if System>QC_max The QC_min, QC_max is used in case of uncertainty:

The duration in QC file could fluctuate because of standard industry tolerances, such as human error. For example, with visiting threshold is 30 seconds, QCers estimate the duration of a visitor with +−5 seconds accuracy.

For example, a QCer estimates the current visitor with duration is 28 (less than the threshold, not count). But another QCer can count it as 31 seconds (greater than the threshold, count).

To compensate for this boundary case, QC_max will increase by 1, not QC_min to create a range of ground truth.

For normal cases when the duration is larger than the threshold, increase both QC_min and QC_max.

To finetune the parameter, the report is created, and corresponding system results are input. The threshold is selected with the desired (e.g., best and most stable) accuracy.

Figure 8:
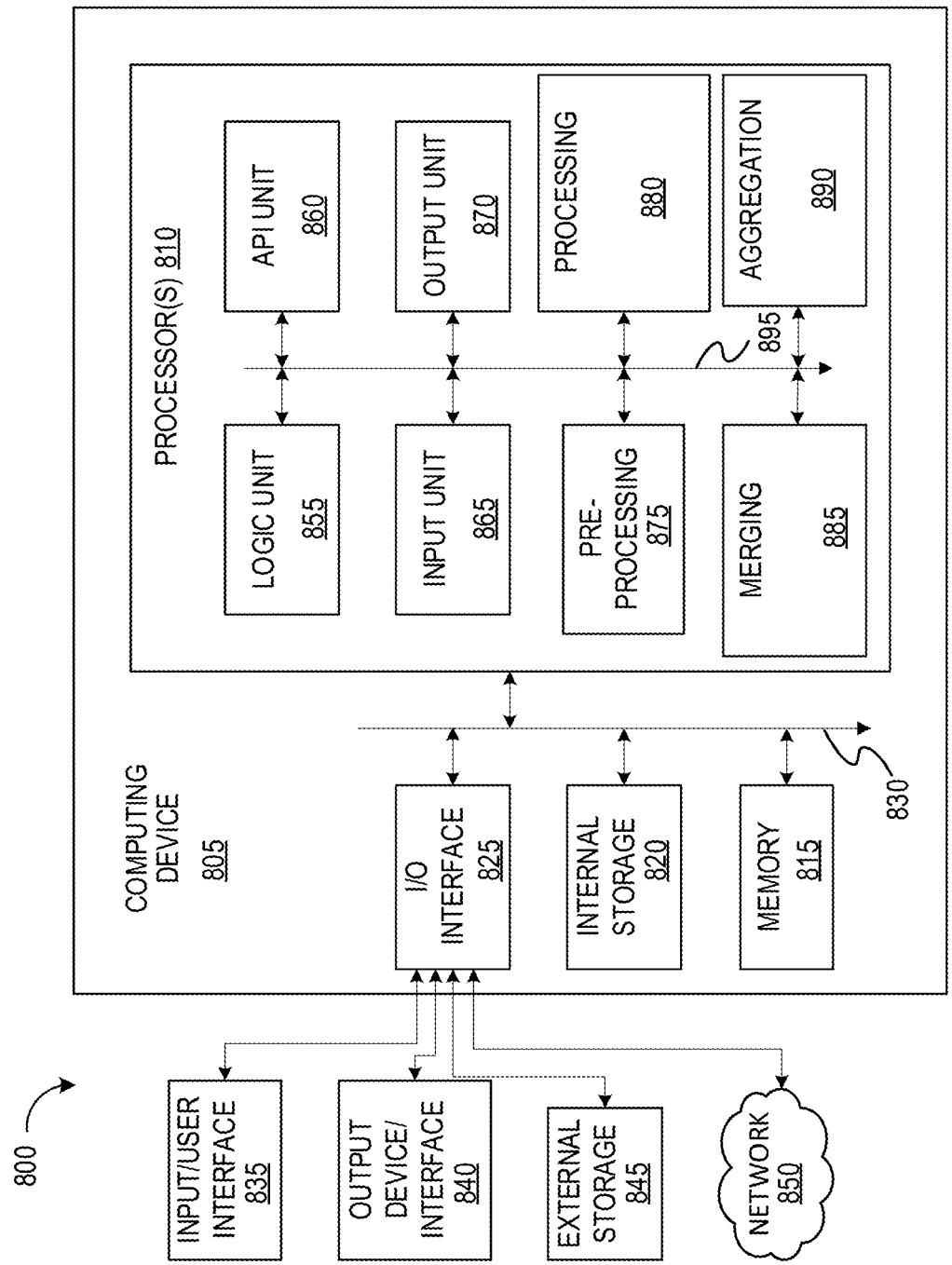
FIG. 8 is a functional block diagram of an embodiment of a computing environment according to the disclosure.

FIG. 8 is a functional block diagram of an embodiment of a computing environment according to the disclosure. A computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805. The environment 800 can support operations associated with the system, for example.

According to the present example implementations, the processing associated with the neural activity may occur on a processor 810 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 805 can be communicatively coupled to input/interface 835 (e.g., video camera) and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as, a server, client, thin server, general machine, special-purpose machine, or another label. For example but not by way of limitation, network 850 may include the blockchain network, and/or the cloud.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, pre-processing unit 875, processing unit 880, merging unit 885, and aggregation unit 890 for the different units (e.g., the encode 110 and the decoder 120) to communicate with each other, with the OS, and with other applications (not shown).

The pre-processing unit 875 can perform functions associated with receiving inputs, processing inputs, and obtaining further inputs; as explained above, the inputs may be different for different devices. The processing unit 880 can perform functions associated with the processing of the pre-processed information inputs to produce one or more extracted bounding boxes. In the merging unit 885, the extracted bounding boxes that were generated in the processing unit 880 and the associated detailed information is merged, so that the bounding boxes of a person are merged together to form a tracklet. In the aggregating unit 890, the tracklets and metadata associated with the user defined sections are aggregated to perform operations that generate analytical outputs, such as insights, that are stored in a database (e.g., 820 or 845) or used by other applications.

For example, the information obtaining unit 875, the function processing unit 880, and the recommendation generation unit 885 may implement one or more processes shown above with respect to the structures described above in addition to the above-described method 600. The described units and elements can be varied in design, function, configuration, or implementation and are not limited to the descriptions provided.

In some example implementations, when information or an execution instruction is received by API unit 860, it may be communicated to one or more other units (e.g., logic unit 855, input unit 865, information obtaining unit 875, function processing unit 880, and recommendation generation unit 885).

In some instances, the logic unit 855 may be configured to control the information flow among the units and direct the services provided by API unit 860, input unit 865, information obtaining unit 875, function processing unit 880, and recommendation generation unit 885 in some example implementations described above. For example, the flow of one or more processes or implementations may be controlled by logic unit 855 alone or in conjunction with API unit 860.

Figure 9:
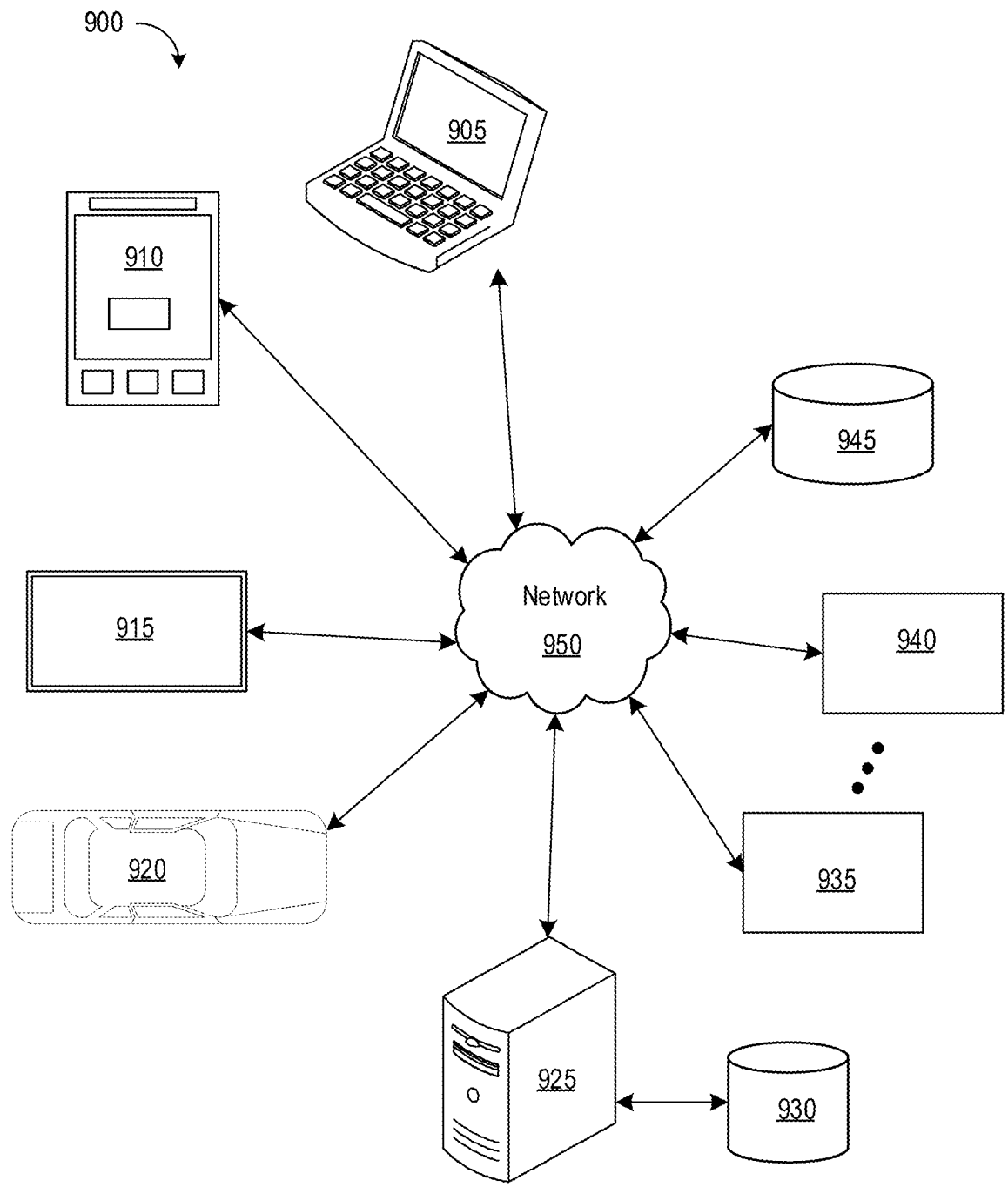
FIG. 9 is a functional block diagram of an exemplary operating environment according to the disclosure.

FIG. 9 is a functional block diagram of an exemplary operating environment according to the disclosure. An environment 900 can be suitable for some example implementations disclosed herein. Environment 900 includes devices 905-945, and each is communicatively connected to at least one other device via, for example, network 950 (e.g., by wired and/or wireless connections). Some devices may be communicatively connected to one or more storage devices 930 and 945.

An example of one or more devices 905-945 may be computing devices 505 described in FIG. 8, respectively. Devices 905-945 may include, but are not limited to, a computer 905 (e.g., a laptop computing device) having a monitor and an associated webcam as explained above, a mobile device 910 (e.g., smartphone or tablet), a television 915, a device associated with a vehicle 920, a server computer 925, computing devices 935-940, storage devices 930 and 945.

In some implementations, devices 905-920 may be considered user devices associated with the users, who may be remotely obtaining a sensed audio input used as inputs for the foregoing example implementations. In the present example implementations, one or more of these user devices 905-920 may be associated with one or more sensors such as microphones in a phone of a user or a POS device at the store, that can sense information as needed for the present example implementations, as explained above.

To provide illustrative examples of the foregoing example implementation, the following case studies are provided.

According to one example implementation, a store may be a store for specialty products, such as beauty products. In one example, measurements were made with respect to the percent of store traffic that each category of product attracted. The results were compared to other stores that are part of the same chain of stores. Based on the comparison, a determination was made that one category of product attracted 20 to 40% of the total visits at some stores, which was well below the average of 70% across all stores. In order to increase the number of visits for that one category of product, a determination was made that the location of the product in the store was a critical factor that impacted the number of visits and thus the number of sales of that product. To attract additional visits, the layout was changed, including rearrangement of product sections, enhancement of lighting, and widening of the gap between shelves. As a result of the changes, the traffic to that category of product increased by 8% and corresponding revenue increase by 22%. The foregoing case study could be implemented using the foregoing example implementations in order to determine the number of visits, the time of the visits, and the additional information and data as explained above, and apply that information to implement the changes, and then using the camera system, measure the impact of the changes.

According to another example implementation, for a chain of jewelry stores, the store layout was segmented into separate parts, and the example implementation was used to measure the visitor traffic in each segment of the store. Based on this information a calculation was made as to the relative proportion of traffic with respect to diamonds, as opposed to the overall traffic within the jewelry store. The results of the application of the example implementations indicated that visitors to the diamond section only accounted for 5% of the store visitors. Based on this information, the layout was modified so that the diamond section was placed in the portion of the store that contained the most visitor traffic, such that the diamond section was the most prominent one. Accordingly, the information and data obtained by the example implementation was applied to determine a portion of the store most conducive to attracting visitors, and to position the diamond section in that location. As a result, the number of visits to the diamond section increased from 5% to 48% of the overall traffic.

According to yet another use case, the example implementations were applied in a mattress store. The mattress store posed unique challenges, because the amount of traffic is lower than other types of stores. The example implementations were used at the mattress store to calculate the traffic by product section, and identify the areas that attracted the most traffic. Those areas were dependent on store layout, such as floor plan, floor shape or the like. Based on the information obtained from the example implementations, the product arrangement was modified. Instead of grouping mattresses of similar specifications close to one another that are sorted by price, the mattresses with the highest profit margins were placed in the section of the store having the most traffic. As a result, the profit per unit increased by 20%.

The foregoing example implementations provide use cases where the cameras as explained above were employed, and operations were performed based on the images and videos captured by those cameras. The result of the example implementations was to obtain the visitor traffic information associated with the various layouts, perform modifications, and obtain the visitor traffic information for the modifications.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

The invention claimed is:

1. A computer-implementation method for person-tracking across video streams, the method comprising:
retrieving a plurality of video streams generated from a plurality of cameras positioned at a retail venue;
performing a normalization operation over extracted frames of the plurality of video streams to generate normalized frames;
processing the normalized frames by extracting bounding boxes over at least one person identified from the normalized frames and extracting one or more foot locations associated with each of the at least one person to generate feature vectors and detect attributes, wherein the feature vectors are multidimensional vectors representing the bounding boxes generated by an artificial intelligence model trained to minimize a distance between vectors of the same persons;
merging extracted bounding boxes associated with each of the at least one person identified from the normalized frames in time series to generate tracklets using a Hungarian matching algorithm, wherein each tracklet is associated with a person of the at least one person identified from the normalized frames, and wherein the Hungarian matching algorithm uses three factors to generate a cost function comprising Euclidean distance between feature vectors of bounding boxes, intersection over union of bounding boxes, and time distances between the bounding boxes; and
aggregating the tracklets and metadata associated with polygons drawn on camera views defining user defined sections of at least one area in the video streams to generate analytical outputs.

2. The method of claim 1, wherein the plurality of video streams is stored in cloud.

3. The method of claim 1, wherein the performing the normalization operation comprises at least one of rescaling video resolution, addressing broken frame, or addressing broken time stamp.

4. The method of claim 1, wherein each of the bounding boxes forms a boundary to cover a portion of a person's body.

5. The method of claim 4, further comprising:
extracting, along with the bounding boxes, the one or more foot locations associated with each of the at least one person identified from the normalized frames.

6. The method of claim 1, wherein each feature vector of the feature vectors is a vector of float value that maps from image space to feature space.

7. The method of claim 6, wherein the merging extracted bounding boxes associated with each of the at least one person identified from the normalized frames in time series comprises:
matching, for each pair of adjacent normalized frames, a person of the at least one person identified from a previous normalized frame to a next normalized frame using the feature vectors; and
wherein images of same person appearing in adjacent normalized frames have smaller Euclidean distance between corresponding ones of the feature vectors than images of a different person appearing in adjacent normalized frames.

8. The method of claim 1, wherein the feature vectors are generated using machine learning model, and the machine learning model is trained using sample images as training data.

9. The method of claim 1, wherein the user defined sections comprise polygons drawn on camera views to define specific areas of interest within the retail venue.

10. The method of claim 1, further comprising:
detecting body direction of each person identified from the normalized frames; and
determining interaction between the person and the user defined sections based on the body direction and one or more foot locations.

11. The method of claim 10, wherein determining interaction comprises:
checking whether the one or more foot locations is within a region of interest;
identifying regions that have an intersection between a solid line representing a shelf and the body direction; and
determining that a person has interest in a corresponding shelf when a number of continuous points of a journey that intersect the solid line exceed a prescribed threshold.

12. The method of claim 1, further comprising:
estimating physical distance between persons in the camera view by calculating displacement coordinates based on maximum displacement in up, down, and horizontal directions for each pixel; and
detecting staff-customer interactions when a staff member is within a prescribed distance of a customer for a prescribed amount of time.

13. The method of claim 1, wherein the analytical outputs comprise at least one of total visitors, dwell time in the retail venue, demographic information associated with visitors, dwell time in each user-defined section, and traffic patterns.

14. The method of claim 1, further comprising:
removing false positive detections by identifying stationary objects that remain at a same location throughout a day;
aggregating, for each pixel in a camera view, a number of bounding boxes that contain that pixel;
generating a graph where nodes represent bounding boxes and edges connect bounding boxes having Euclidean distance on feature space less than a prescribed threshold; and removing bounding boxes in connected components determined to be false positive components.

15. The method of claim 1, further comprising:
estimating physical distance between persons in the camera view by calculating displacement coordinates based on maximum displacement in up, down, and horizontal directions for each pixel;
wherein for each pixel in the camera view, maximum displacement is determined in up vertical direction, down vertical direction, and horizontal direction within a given timeframe.

16. The method of claim 15, wherein estimating physical distance comprises:
calculating Euclidean distance on camera view in pixels between two positions;
estimating unit distance based on maximum displacement values and delta calculations; and
converting pixel distance to floor distance by multiplying time calculations by a conversion factor.

17. The method of claim 15, wherein the displacement coordinates are calculated by:
extracting frames from videos by frames per second;
detecting persons in each frame with corresponding foot positions on the camera view;
matching visitors from previous frame to next frame using feature distance; and
calculating maximum displacement in up, down, and horizontal directions for each matching pair of visitors.

18. The method of claim 15, further comprising:
performing interpolation for pixels missing displacement data using adjacent pixels having data;
wherein the interpolation is based on floor distance of upper region of camera being smaller than distance of lower region.

19. The method of claim 1, further comprising:
detecting body direction of each person identified from the normalized frames;
defining regions of interest on camera views by drawing polygons to indicate specific sections or shelves of interest within the retail venue; and
determining interaction between the person and the user defined sections based on the body direction and the one or more foot locations.

20. The method of claim 19, wherein determining interaction comprises:
checking whether the one or more foot locations is within a region of interest;
identifying regions that have an intersection between a solid line representing a shelf and the body direction; and
determining that a person has interest in a corresponding shelf when a number of continuous points of a journey that intersect the solid line exceed a prescribed threshold.

21. The method of claim 20, further comprising:
filtering records having related section names;
connecting adjacent records to groups using recording time when two records have a time distance smaller than a threshold;
calculating duration for each group; and
removing groups from final results if the duration is less than a prescribed duration threshold.

22. The method of claim 19, wherein detecting body direction comprises:
splitting a circle into a plurality of sections;
performing a prediction operation to determine a predicted portion that a vector associated with the person belongs to;
assigning a numerical index to each part of the circle; and
converting each index into a gradient using a formula to estimate visitor direction.

23. The method of claim 1, further comprising:
removing false positive detections by identifying stationary objects that remain at a same location throughout a day;
aggregating, for each pixel in a camera view, a number of bounding boxes that contain that pixel;
generating a graph where nodes represent bounding boxes and edges connect bounding boxes having Euclidean distance on feature space less than a prescribed threshold; and
removing bounding boxes in connected components determined to be false positive components.

24. The method of claim 23, wherein determining false positive components comprises:
selecting a prescribed number of highest pixels having most bounding boxes containing those pixels;
generating a list of bounding boxes containing the selected pixels;
detecting connected components in the generated graph; and
identifying components as false positive components when total bounding boxes exceed a threshold and maximum timestamp minus minimum timestamp exceeds one hour.

25. The method of claim 1, further comprising:
automatically calculating overlapping camera views by:
grouping videos by camera view and extracting frames from the videos for each camera view;
detecting persons in each frame and deriving corresponding foot positions on camera views;
performing feature extraction for each person in each frame for each camera view; and
checking overlapping conditions by matching bounding boxes at same time on both camera views to determine if camera pairs are overlapping pairs.

26. The method of claim 25, further comprising:
building a camera relationship graph by:
defining overlapping camera pairs when a visitor appears simultaneously on views of both cameras in the pair;
defining nearby camera pairs when a visitor appears on views of both cameras within a prescribed time period; and
defining long distance camera pairs when conditions for overlapping and nearby camera pairs are not met.

27. The method of claim 26, wherein checking overlapping conditions comprises:
matching bounding boxes at substantially same time on both camera views;
confirming if a visitor exists on both camera views at same time by comparing feature distance on feature space; and
characterizing camera pairs as overlapping pairs when visitor is confirmed to exist on both camera views simultaneously.

28. A non-transitory computer readable medium, storing instructions for person-tracking across video streams, the instructions comprising:
retrieving a plurality of video streams generated from a plurality of cameras positioned at a retail venue;

performing a normalization operation over extracted frames of the plurality of video streams to generate normalized frames;

processing the normalized frames by extracting bounding boxes over at least one person identified from the normalized frames and extracting the one or more foot locations associated with each of the at least one person to generate feature vectors and detect attributes, wherein the feature vectors are multidimensional vectors representing the bounding boxes generated by an artificial intelligence model trained to minimize a distance between vectors of the same persons;

merging extracted bounding boxes associated with each of the at least one person identified from the normalized frames in time series to generate tracklets using a Hungarian matching algorithm, wherein each tracklet is associated with a person of the at least one person identified from the normalized frames, and wherein the Hungarian matching algorithm uses three factors to generate a cost function comprising Euclidean distance between feature vectors of bounding boxes, intersection over union of bounding boxes, and time distances between the bounding boxes; and aggregating the tracklets and metadata associated with polygons drawn on camera views defining user defined sections of at least one area in the video streams to generate analytical outputs.

29. The non-transitory computer readable medium of claim 28, wherein the plurality of video streams is stored in cloud.

30. The non-transitory computer readable medium of claim 28, wherein the performing the normalization operation comprises at least one of rescaling video resolution, addressing broken frame, or addressing broken time stamp.

31. The non-transitory computer readable medium of claim 28, wherein each of the bounding boxes forms a boundary to cover a portion of a person's body.

32. The non-transitory computer readable medium of claim 31, further comprising:
extracting, along with the bounding boxes, the one or more foot locations associated with each of the at least one person identified from the normalized frames.

33. The non-transitory computer readable medium of claim 28, wherein each feature vector of the feature vectors is a vector of float value that maps from image space to feature space.

34. The non-transitory computer readable medium of claim 33, wherein the merging extracted bounding boxes associated with each of the at least one person identified from the normalized frames in time series comprises:
matching, for each pair of adjacent normalized frames, a person of the at least one person identified from a previous normalized frame to a next normalized frame using the feature vectors; and
wherein images of same person appearing in adjacent normalized frames have smaller Euclidean distance between corresponding ones of the feature vectors than images of a different person appearing in adjacent normalized frames.

35. The non-transitory computer readable medium of claim 28, wherein the feature vectors are generated using machine learning model, and the machine learning model is trained using sample images as training data.

36. The non-transitory computer readable medium of claim 28, wherein the user defined sections comprise polygons drawn on camera views to define specific areas of interest within the retail venue.

37. The non-transitory computer readable medium of claim 28, the instructions further comprising:
detecting body direction of each person identified from the normalized frames; and
determining interaction between the person and the user defined sections based on the body direction and the one or more foot locations.

38. The non-transitory computer readable medium of claim 37, wherein determining interaction comprises:
checking whether the one or more foot locations is within a region of interest;
identifying regions that have an intersection between a solid line representing a shelf and the body direction; and
determining that a person has interest in a corresponding shelf when a number of continuous points of a journey that intersect the solid line exceed a prescribed threshold.

39. The non-transitory computer readable medium of claim 28, the instructions further comprising:
estimating physical distance between persons in the camera view by calculating displacement coordinates based on maximum displacement in up, down, and horizontal directions for each pixel; and
detecting staff-customer interactions when a staff member is within a prescribed distance of a customer for a prescribed amount of time.

* * * * *